(12) United States Patent
Driggs et al.

(10) Patent No.: US 7,760,135 B2
(45) Date of Patent: Jul. 20, 2010

(54) ROBUST PULSE DEINTERLEAVING

(75) Inventors: Stan W. Driggs, Vestal, NY (US); Thomas J. Eckenrode, Endicott, NY (US); Walter S. Richter, Newark Valley, NY (US); Jerry L. Twoey, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/986,899

(22) Filed: Nov. 27, 2007

(65) Prior Publication Data
US 2009/0135052 A1 May 28, 2009

(51) Int. Cl.
*G01S 13/00* (2006.01)
(52) U.S. Cl. ................... 342/195; 342/90; 342/159
(58) Field of Classification Search ............. 342/195, 342/90
See application file for complete search history.

(56) References Cited

U.S. PATENT DOCUMENTS

| | | | | |
|---|---|---|---|---|
| 4,025,920 A | * | 5/1977 | Reitboeck et al. ........... 342/13 |
| 4,516,220 A | * | 5/1985 | Baumann ................ 708/212 |
| 4,851,854 A | * | 7/1989 | Drogin .................. 342/417 |
| 4,879,561 A | * | 11/1989 | Inkol ................... 342/195 |
| 4,995,088 A | | 2/1991 | Farhat |
| 4,996,666 A | | 2/1991 | Duluk, Jr. |
| 5,061,930 A | | 10/1991 | Nathanson et al. |
| 5,063,385 A | * | 11/1991 | Caschera ................ 342/13 |
| 5,263,097 A | * | 11/1993 | Katz et al. ............. 382/190 |
| 5,323,161 A | * | 6/1994 | Gailer et al. ............ 342/13 |
| 5,359,697 A | | 10/1994 | Smith et al. |
| 5,517,193 A | | 5/1996 | Allison et al. |
| 5,561,429 A | * | 10/1996 | Halberstam et al. ........ 342/14 |
| 5,583,505 A | | 12/1996 | Andersen et al. |
| 5,684,577 A | | 11/1997 | Kash |
| 5,838,806 A | | 11/1998 | Sigwanz et al. |
| 6,016,119 A | | 1/2000 | Krasner |
| 6,208,544 B1 | | 3/2001 | Beadle et al. |
| 6,460,127 B1 | | 10/2002 | Akerib |
| 6,473,846 B1 | | 10/2002 | Melchior |
| 6,629,099 B2 | | 9/2003 | Cheng |
| 6,643,204 B1 | | 11/2003 | Agrawal |
| 6,697,276 B1 | | 2/2004 | Pereira et al. |
| 6,799,246 B1 | * | 9/2004 | Wise et al. ............. 711/117 |
| 6,903,953 B2 | | 6/2005 | Khanna |
| 6,944,709 B2 | | 9/2005 | Nataraj et al. |
| 6,982,681 B2 | * | 1/2006 | Orfei et al. ............ 343/915 |

(Continued)

OTHER PUBLICATIONS

"Fully Parallel Integrated CAM/RAM Using Preclassification to Enable Large Capacities", Schultz, K.J.; Gulak, P.G.—Solid State Circuits IEEE Journal of—vol. 21, Issue 5 May 1996 (pp. 689-699) Digital Object Identifier 10.1109/4.509851.

*Primary Examiner*—Thomas H Tarcza
*Assistant Examiner*—Matthew M Barker
(74) *Attorney, Agent, or Firm*—Tarolli, Sundheim, Covell & Tummino LLP

(57) ABSTRACT

Systems and methods are presented for associating time slices of a received signal with previously encountered time slices. A parameter determination component determines at least one parameter for each received time slice. A content addressable memory stores a plurality of parameter values associated with the previously encountered time slices. The content addressable memory is searchable such that the determined at least one parameter for each received time slice can be compared to the stored plurality of parameter values to provide a memory output. An emitter matching component associates a given received time slice with one of a plurality of emitters according to the memory output.

17 Claims, 3 Drawing Sheets

U.S. PATENT DOCUMENTS

| | | |
|---|---|---|
| 6,985,102 B1 | 1/2006 | Horn et al. |
| 6,987,683 B2 | 1/2006 | Ao |
| 7,358,887 B2 * | 4/2008 | Gounalis .................... 342/20 |
| 2002/0161969 A1 * | 10/2002 | Nataraj et al. ............... 711/108 |
| 2004/0078516 A1 * | 4/2004 | Henderson et al. .......... 711/108 |
| 2007/0260814 A1 * | 11/2007 | Branscome et al. ......... 711/108 |
| 2007/0287913 A1 * | 12/2007 | Regni ........................ 600/439 |
| 2008/0150786 A1 * | 6/2008 | Breed ......................... 342/53 |

* cited by examiner

ROBUST PULSE DEINTERLEAVING

FIELD OF THE INVENTION

The present invention is directed generally to signal processing and is particularly directed to a deinterleaving system for extracting a weak signal from noise.

BACKGROUND OF THE INVENTION

It is often desirable to extract a signal from a high noise environment. For example, a radio beacon on a downed aircraft may provide a faint radio signal that is overshadowed by background radio noise. Similarly, a signal from a communication device such as a cellular phone might be masked by noise at the edge of a specified coverage area. Such signals are particularly difficult to detect or analyze, as most attempts to amplify the weak signal will also amplify the accompanying noise. If one or more characteristics of the signal can be determined through the noise, however, it may be possible to retrieve the signal from a buffer or determine the location of the source. To this end, deinterleaving systems sort incoming signal pulses according to one or more characteristics. Once a sufficient number of pulses have been accumulated for each signal, characteristics of the signal source, such as a base pulse frequency, an offset value, and a location, can be determined.

SUMMARY OF THE INVENTION

In accordance with one aspect of the present invention, a deinterleaving system is provided that associates time slices of a received signal with previously encountered time slices. A parameter determination component determines at least one parameter for each received time slice. A content addressable memory stores a plurality of parameter values associated with the previously encountered time slices. The content addressable memory is searchable such that the determined at least one parameter for each received time slice can be compared to the stored plurality of parameter values to provide a memory output. An emitter matching component associates a given received time slice with one of a plurality of emitters according to the memory output.

In accordance with another aspect of the present invention, a method is provided for determining at least one characteristic of an emitter. A received signal is conditioned to identify a plurality of time slices. At least one parameter of each of the plurality of time slices is determined. An imprecise search of a memory is conducted for the determined at least one parameter, such that the determined at least one parameter is compared to a first stored string of ternary bits, representing a first range of values, and a second stored string of ternary bits, representing a second range of values smaller than the first range of values to produce a memory output. Each time slice is associated with one of a plurality of emitters according to the memory output. At least one characteristic of the emitter is determined from a plurality of time slices associated with the emitter.

In accordance with yet another aspect of the present invention, a radar detection system is provided. At least one radio frequency receiver receives a radio frequency signal and conditions the received signal to provide a plurality of signal pulses for analysis. A parameter determination component determines at least one parameter for each received signal pulse. A content addressable memory stores a plurality of parameter values associated with previously encountered signal pulses. The content addressable memory is searchable such that the determined at least one parameter for each received signal pulse can be compared to the stored plurality of parameter values to provide a memory output.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

Figure 1:
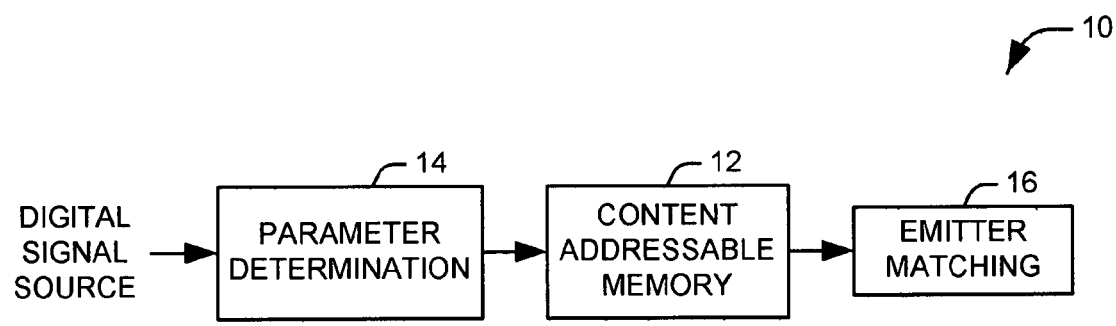
FIG. 1 illustrates a deinterleaving system in accordance with an aspect of the present invention.

FIG. 1 illustrates a deinterleaving system 10 in accordance with an aspect of the present invention. To deinterleave an incoming signal, it is necessary to compare one or more parameters associated with incoming signal portions with corresponding parameters stored in memory, for example, characteristics from previous pulses or expected signal characteristics. As the number of stored signal characteristics increase, the time necessary to complete these comparisons becomes significant, causing a bottleneck on system performance.

In accordance with an aspect of the present invention, the system 10 is configured to allow for an efficient comparison process to reduce the time necessary to deinterleave digital signals. To this end, the system 10 can include a content addressable memory 12 that can be searched in a single processing cycle to match a value one characteristic of a pulse with a corresponding value stored in the content addressable memory. Accordingly, the system can quickly group pulses from the same source to determine one or more properties of the signal source.

Time slices of a received signal, representing a plurality of signal sources, are provided to a parameter extraction component 14. In one implementation, the time slices are selected to represent candidate pulses within the signal. The parameter determination component 14 evaluates each time slice of the signal to determine one or more parameters associated with the time slice. For example, these parameters can include pulse or peak width, frequency, power, amplitude, and phase. It will be appreciated that the specific parameters extracted from the time slices can vary with the application and the expected nature of the signal.

The one or more extracted parameters are then provided to respective content addressable memories 12. The content addressable memories 12 store a plurality of parameter values associated with the previously encountered time slices. The content addressable memories can be searched for the determined at least one parameter for each received time slice to locate any matching values in the memory. In one implementation, the content addressable memories can be implemented as ternary content addressable memories, such that memory values can be stored as a range. For example, by storing a least significant bit of one value as a ternary "don't care" bit, the effective range of matching values for that memory location is doubled.

The output of the memory is provided to an emitter matching component 16 that associates a given received time slice with one of a plurality of emitters according to the memory output. The emitter matching component 16 associates the time slice to one of a plurality of emitters based upon the memory output to create a group of time slices associated with each emitter. For example, the emitter matching component 16 can associate each time slice with an emitter that corresponds to a memory match or establish a new emitter class if no match is found in the memory. Alternatively, the emitter matching component 16 can comprise a rule based classifier that associates the time slice with an emitter based on a set of logical rules.

Figure 2:
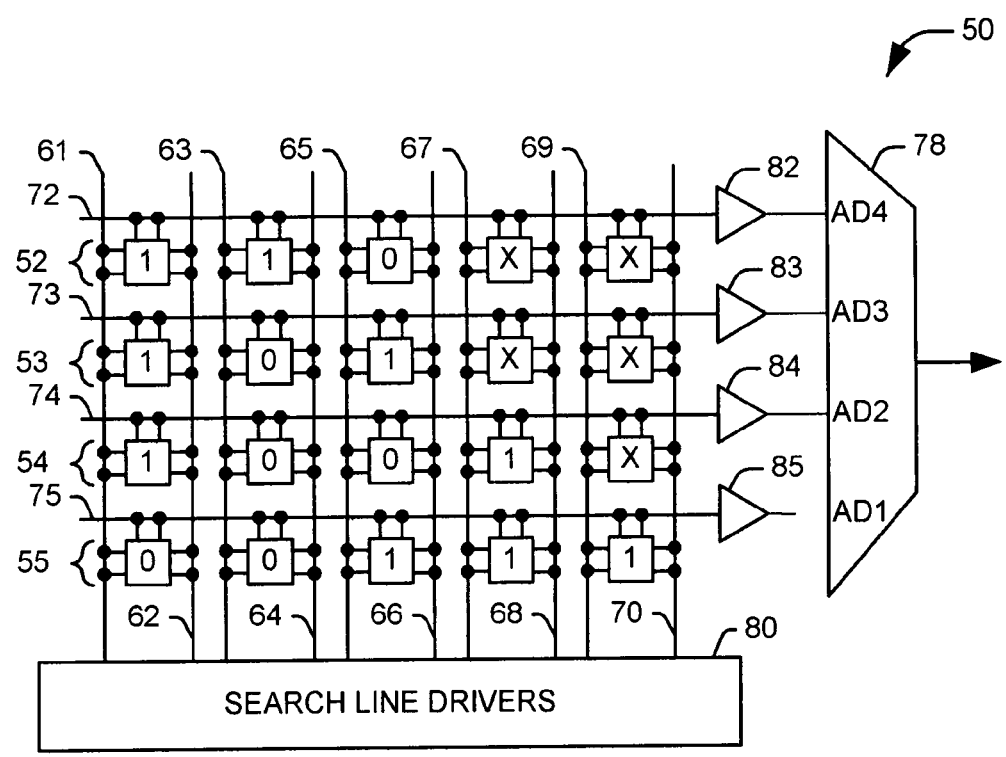
FIG. 2 illustrates one implementation of a ternary content addressable memory.

FIG. 2 illustrates one implementation of a ternary content addressable memory 50. The illustrated ternary content addressable memory 50 is a searchable hardware memory that stores a string of ternary bits (e.g., 1, 0, and "don't' care") at each of a plurality of memory locations 52-55, each comprising a plurality of cells that each store one of the ternary bits. In the illustrated example, four memory locations containing five-bit strings are shown, but it will be appreciated that a ternary content addressable memory having substantial capacity, for example, in the kilobyte or megabyte range, can be utilized in practical applications.

The memory includes a plurality of search lines 61-70 that allow the content of the memory locations 52-55 to be searched. Each pair of search lines (e.g., 61 and 62) are associated with one bit place of at least a portion plurality of memory locations. Each memory location is represented by an associated match line 72-75 that indicates the presence of a match or mismatch at an associated encoder 78.

During operation, all of the match lines 72-75 are initially set to a voltage high state, putting them all temporarily in the match state. A set of search line drivers 80 control the state of the search lines 61-70 to represent a string of search data. At each cell, the data stored in the cell is compared to the state of its associated pair of search lines (e.g., 61 and 62). Cells with matching data have no effect on the match line (e.g., but any cell having data that does not match the search lines pulls its associated match line to a voltage low state. Cells that contain a don't care state, designated as "X" in FIG. 2, always operate as if a match has occurred. The aggregate result is that match lines are pulled down for any word that has at least one mismatch. Any match lines that remain at a voltage high represent a match. These match lines are read at the encoder 78 through respective match line amplifiers 82-85, and the encoder outputs an address for at least one matching memory location.

It will be appreciated that the ternary memory allows for imprecise matching of pulse data. For example, in the first illustrated memory location 52, the cells representing the two least significant bits are set to don't care values. Accordingly, a first memory location 52 can be configured to match a first range of values, and a second memory location 54 can be configured to match a second, smaller range of values. This allows for significant flexibility in matching incoming signals to appropriate signal sources.

Figure 3:
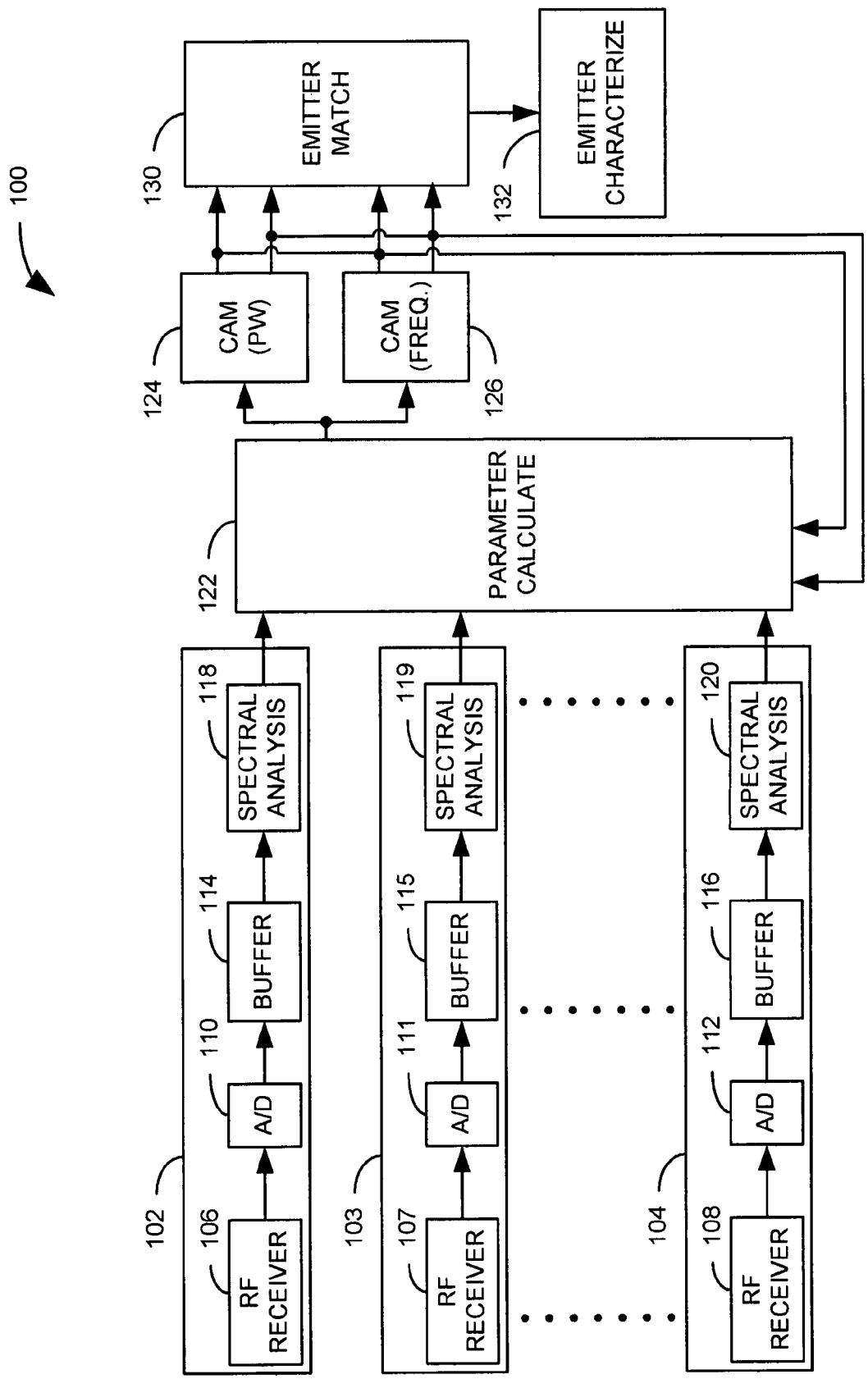
FIG. 3 illustrates an exemplary electronic support measures system in accordance with an aspect of the present invention.

FIG. 3 illustrates an exemplary electronic support measures system 100 in accordance with an aspect of the present invention. The system 100 comprises a plurality of receiver units 102-104 that monitor respective associated areas for radio frequency signals. Each of the plurality of receivers comprises an RF receiver component 106-108 that receives one or more RF signals, filters the signal to reduce obvious noise, and downconverts the signal for analysis. The downconverted signals are then converted to digital signals at respective analog-to-digital converters 110-112, and the digital signals are stored in buffers 114-116. For example, the buffer can be implemented as SDRAM or another appropriate memory component.

Respective spectral analysis components 118-120 retrieve the signal from the buffer and determine frequency properties of the signal. For example, a fast Fourier transform can be performed to determine frequency characteristics of the signal. The signal can then be conditioned according to the frequency content to remove noise and isolate signals representing one or more emitters. In the illustrated example, the isolated signals 118-120 can take the form of individual signal pulses from one or more emitters.

The signals are then provided to a parameter calculation component 122 that determines one or more parameters for each of the signal pulses. In the illustrated example, a pulse width and at least one characteristic frequency is determined for each pulse. The determined parameters are then provided to respective content addressable memories (CAM) 124 and 126 to determine whether the determined values match stored values associated with previously encountered signal pulses, and thus, presumably, one of a plurality of emitters in a monitored area. In the illustrated example, a first content addressable memory 124 stores a plurality of pulse width values associated with previously encountered signal pulses and a second content addressable memory 126 stores frequency values associated with previously encountered signal pulses.

In accordance with an aspect of the present invention, the content addressable memories 124 and 126 can be implemented as ternary content addressable memories to allow for imprecise searching of parameter values. For example, a value for a given potential emitter can be stored with one or more "don't care" bits in the least significant bits to broaden the range of acceptable values for that emitter. In one implementation, each potential emitter can be represented by multiple memory values, a first value with a first number of "don't care" bits, and additional values having a varying numbers of "don't care" bits, such that the first value represents a largest range and the other values representing smaller ranges within the largest range. A match with a given emitter can be given a confidence value depending on the number of values associated with that emitter that match the parameter value, such that matches in the more narrow range of values are given greater weight.

The output of the content addressable memories 124 and 126 is provided to an emitter matching component 130. The emitter matching component 130 associates the signal pulse to one of a plurality of emitters based upon the output of the content addressable memories 124 and 126 to create a group of signal pulses associated with each emitter. For example, the emitter matching component 130 can associate the signal pulse with an emitter associated with the memory match or establish a new emitter class if no match is found in the memory. Alternatively, the emitter matching component 130 can comprise a rule based classifier that associates the signal pulse with an emitter based on a set of logical rules, any matches from the content addressable memories 124 and 126 and any confidence determined for the memory outputs.

An emitter characterization component 132 evaluates the determined pulse groups to determine one or more characteristics of the emitter associated with each pulse group. For example, a base clock period associated with the emitter and a location of the emitter can be determined from the clock pulses comprising the group and their respective times of arrival. It will be appreciated that other characteristics of the emitter can also be determined from the pulses comprising each group.

Figure 4:
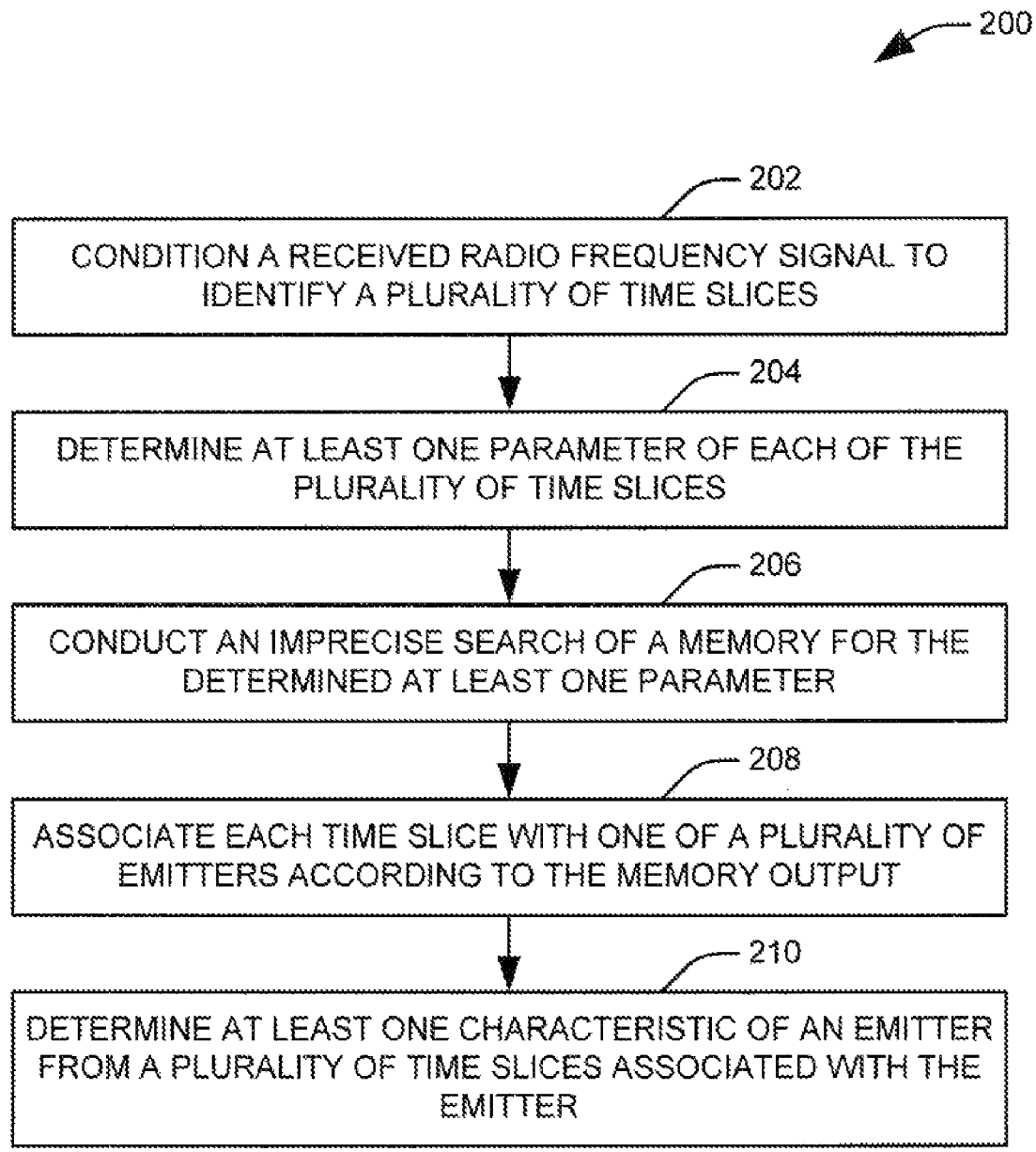
FIG. 4 illustrates a methodology for determining at least one characteristic of an emitter in accordance with an aspect of the present invention.

In view of the foregoing structural and functional features described above, methodologies in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates a methodology 200 for determining at least one characteristic of an emitter in accordance with an aspect of the present invention. At step 202, a received radio frequency signal is conditioned to identify a plurality of time slices. To condition the signal, the frequency content of the signal is determined, and one or more signals of interest can be isolated. Time slices of interest within each signal of interest, for example, identified signal pulses, can be isolated for analysis.

At step 204, at least one parameter of each of the plurality of time slices is determined. In one implementation, the at least one parameter includes a pulse width and a characteristic frequency for each time slice, but it will be appreciated that other parameters can be extracted, depending on the application and the nature of the signal. At step 206, an imprecise search of a memory is conducted for the determined at least one parameter. During the imprecise search, a given parameter can be compared to strings of ternary bits having varying numbers of "don't' care" bits in the least significant positions, such that the parameter is compared to a first string, representing a first range of values, and a second string, representing a second range of values smaller than the first range of values.

At step 208, each time slice with one of a plurality of emitters according to the memory output. For example, each string of bits in the memory can be associated with an emitter, and the time slice can be associated with the emitter corresponding to the matching string. Alternatively, a classification process can be used in which multiple memory outputs are arbitrated to classify the signal pulse as associated with one of the emitters. At step 210, at least one characteristic of an emitter is determined from a plurality of time slices associated with the emitter. For example, the determined parameters can include an emitter clock period, an emitter clock offset, a clock drift factor, defining a difference in phase between the receiver base clock and the emitter base clock, and a set of Cartesian coordinates, x, y, and z, defining the emitter location.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim the following:

1. A deinterleaving system that associates time slices of a received signal with previously encountered time slices, comprising:

a parameter determination component that determines at least one parameter for each received time slice;

a ternary content addressable memory that stores a plurality of parameter values associated with the previously encountered time slices, the content addressable memory being searchable such that the determined at least one parameter for each received time slice can be compared to the stored plurality of parameter values to provide a memory output, the stored plurality of parameter values comprising a first parameter value having at least one "don't care" bit as at least one least significant bit as to represent a first range of values, and a second parameter value representing a smaller range of values that is subsumed by the first range of values, the first parameter value and the second parameter value representing the same emitter; and an emitter matching component that associates a given received time slice with one of a plurality of emitters according to the memory output.

2. The system of claim 1, the parameter determination component comprising a pulse width determination component that determines an associated pulse width of each received time slice.

3. The system of claim 1, further comprising a spectral analysis component that determines at least one frequency characteristic of the received signal via a fast Fourier transform.

4. The system of claim 1, further comprising an emitter characterization element that calculates at least one characteristic of an emitter from a plurality of time slices associated with the emitter by the emitter matching component.

5. The system of claim 1, the determined at least one parameter comprising a first parameter and a second parameter, and the content addressable memory comprising a first content addressable memory that stores parameter values associated with the first parameter and a second content addressable memory that stores parameter values associated with the second parameter.

6. The system of claim 1, the emitter matching component comprising a rule-based classifier.

7. A radar detection system, comprising:

at least one radio frequency receiver that receives an radio frequency signal and conditions the received signal to provide a plurality of time slices for analysis; and the deinterleaving system of claim 1.

8. A method for determining at least one characteristic of an emitter, comprising:

conditioning a received signal to identify a plurality of time slices;

determining at least one parameter of each of the plurality of time slices;

conducting an imprecise search of a memory for the determined at least one parameter, such that the determined at least one parameter is compared to a first stored string of ternary bits, representing a first range of values, and a second stored string of ternary bits, representing a second range of values smaller than the first range of values to produce a memory output;

associating each time slice with one of a plurality of emitters according to the memory output; and determining the at least one characteristic of the emitter from a plurality of time slices associated with the emitter.

9. The method of claim 8, wherein conducting the imprecise search of the memory comprises searching a ternary content addressable memory that is configured to be searched in one processing cycle.

10. The method of claim 8, wherein the first range of values and the second range of values both represent a first emitter, and the first range of values encompasses the second range of values.

11. The method of claim 8, wherein the plurality of time slices represent signal pulses and the determined at least one parameter comprises a pulse width.

12. The method of claim 8, wherein conditioning the received signal comprises calculating a fast Fourier transform of the received signal.

13. A radar detection system, comprising:
   at least one radio frequency receiver that receives an radio frequency signal and conditions the received signal to provide a plurality of signal pulses for analysis;
   a parameter determination component that determines at least one parameter for each received signal pulse; and
   a ternary content addressable memory that stores a plurality of parameter values associated with previously encountered signal pulses, the ternary content addressable memory being searchable such that the determined at least one parameter for each received signal pulse can be compared to the stored plurality of parameter values to provide a memory output, the stored plurality of parameter values comprising a first parameter value having at least one "don't care" bit as at least one least significant bit as to represent a first range of values, and a second parameter value representing a smaller range of values that is subsumed by the first range of values, the first parameter value and the second parameter value each representing a first emitter.

14. The system of claim 13, further comprising an emitter matching component that associates a given signal pulse with one of a plurality of emitters according to the memory output.

15. The system of claim 14, further comprising an emitter characterization element that calculates at least one characteristic of an emitter from a plurality of signal pulses associated with the emitter by the emitter matching component.

16. The system of claim 13, the determined at least one parameter comprising a first parameter and a second parameter, and the ternary content addressable memory comprising a first content addressable memory that stores parameter values associated with the first parameter and a second content addressable memory that stores parameter values associated with the second parameter.

17. The system of claim 13, the parameter determination component comprising a pulse width determination component that determines an associated pulse width of each signal pulse.

\* \* \* \* \*